Patented July 10, 1934

1,966,260

UNITED STATES PATENT OFFICE 1,966,260

COPPER ALLOY WELDING ROD AND METHOD OF USING THE SAME

Elmer L. Munson, Naugatuck, Conn., assignor to The American Brass Company, Waterbury, Conn., a corporation of Connecticut No Drawing. Application May 12, 1932, Serial No. 610,995

6 Claims. (Cl. 113—112)

My invention relates to improved welding, brazing, and hard soldering metals and alloys, such for example, as brasses, bronzes, and other copper alloys, nickel, nickel alloys, iron, steel, etc., and has for an object to provide a denser, stronger and greatly improved weld.

The invention involves the method of making a weld wherein the composition of the welding material is characterized by the presence of a certain amount of barium.

There has been experienced heretofore difficulty in obtaining sound welds, because due to the presence or introduction of gas into the weld metal, there have been formed cavities, holes or voids in the subsequently solidified metal. My invention overcomes this difficulty and removes or lessens the number and size of these holes and cavities to a marked degree.

Also ordinarily unsoundness in the weld metal is increased by raising or prolonging the casting or welding temperature. I have found that barium in the weld metal greatly improves the soundness under such temperature conditions within a temperature range of several hundred degrees centigrade, and therefore a weld in which barium is used is much less likely to be weakened by an increased or prolonged welding temperature. I have found that the weld metal is caused to shrink, and in consequence promotes the strength of the weld. Furthermore, that shrinkage cracks do not appear either during or after the welding.

Previously there has been experienced a failure of the weld metal to bond perfectly at all times with the base metal, and particularly has this been noticeable in the case of iron and steel. I have found that there has been a marked improvement in this bond between the welding metal and the base metal due to the addition of barium to the welding metal.

Barium when added to copper and copper alloys prevents the formation of gas cavities during solidification, in other words, it degassifies copper alloys. The improvement in the weld metal or weld due to the presence of barium may be accomplished when used either with or without a deoxidizer, such for example as prosphorus, silicon, magnesium, aluminum, zinc, calcium, silver, tin, beryllium, or manganese.

In other words I have found that barium introduced into or used with a welding alloy or material containing a relatively large amount of copper reduces the size and number of gas cavities, and makes a sounder, denser weld metal. It promotes the shrinkage of the weld metal and also promotes a proper fusion between the weld and the parent metal. That is, it promotes proper penetration and thus increases the strength of the bond between the weld and the base metal. Barium also increases the strength of the weld metal and prevents the formation of shrinkage cracks. It also increases the ductility of the weld metal. In welding iron and steel barium forms compounds with the carbon or graphite in the iron and steel promoting a better bond between the weld and the base metal. Barium further permits raising or prolonging the usual welding temperature of the weld alloy without injury to the welded joint. It reduces the grain size in the structure of the weld joint and increases the corrosion resistance of the weld joint.

The barium metal or barium alloy finely divided may be added to a welding flux for use in the welding operation, thereby accomplishing degassification in a manner similar to that carried out by the use of barium in the solid wire, sheet, tube or other form as an alloy with copper or copper alloys.

However, although the barium as indicated above may be introduced into the metal of the weld by incorporating it in the flux, it is preferably introduced as an element of a copper base alloy in the form of a solid rod, wire, sheet, tube, etc. Thus the welding rod, wire or other form would preferably be characterized by over fifty percent copper and may contain one or more other metals, such for example as zinc, tin or other metals above mentioned, or any metals alloys of which with copper can be used for welding purposes. A barium content of about 0.10 percent to about 1.00 percent is preferred, but it may range from 0.001 percent to about 5.0 percent. As some barium will be lost in the welding operation, for best results there should be sufficient barium in the welding rod or other form so that the metal of the weld will contain barium in amount from 0.001 percent to about 4.0 percent.

Having thus set forth the nature of my invention, what I claim is:

1. The method of welding metals which comprises adding copper or a copper base alloy and introducing barium into the weld during the welding operation in sufficient amount that the metal of the weld will contain barium in amounts from 0.001 percent to about 4.0 percent.

2. The method of welding metals which comprises adding to the weld a copper base alloy including barium and in sufficient amount that the metal of the weld will contain from 0.001 percent to about 4.0 percent barium.

3. The method of welding metals which comprises adding to the weld a copper base alloy including barium in amount from approximately 0.10 percent to 1.0 percent.

4. A welding or filler rod comprising a copper base alloy including barium in amount from about 0.10 percent to about 1.0 percent.

5. A welding or filler rod comprising a copper base alloy including barium from 0.001% to 5.0%.

6. The method of welding metals which comprises adding to the weld a copper base alloy including barium in amount from 0.001 percent to 5.0 percent.

ELMER L. MUNSON.